(12) United States Patent
Bassi (10) Patent No.: US 11,285,699 B2
(45) Date of Patent: Mar. 29, 2022

(54) MANUFACTURED PRODUCT FOR COVERING SURFACES AND RELATED PROCESSES OF REALIZATION AND LAYING

(71) Applicant: BASSI GROUP INTERNATIONAL S.R.L., Castelnovo di Sotto (IT)

(72) Inventor: Andrea Bassi, Castelnovo di Sotto (IT)

(73) Assignee: Bassi Group International S.r.l., Castelnovo di Sotto (IT)

( * ) Notice: Subject to any disclaimer, the term of this patent is extended or adjusted under 35 U.S.C. 154(b) by 0 days.

(21) Appl. No.: 15/760,542

(22) PCT Filed: Sep. 16, 2016

(86) PCT No.: PCT/IB2016/055529
§ 371 (c)(1),
(2) Date: Mar. 15, 2018

(87) PCT Pub. No.: WO2017/046753
PCT Pub. Date: Mar. 23, 2017

(65) Prior Publication Data
US 2018/0257340 A1    Sep. 13, 2018

(30) Foreign Application Priority Data
Sep. 16, 2015  (IT) .......................... UB2015A003663

(51) Int. Cl.
*B32B 15/08* (2006.01)
*B32B 7/12* (2006.01)
(Continued)

(52) U.S. Cl.
CPC ................ *B32B 15/08* (2013.01); *B32B 3/14* (2013.01); *B32B 7/04* (2013.01); *B32B 7/12* (2013.01);
(Continued)

(58) Field of Classification Search
None
See application file for complete search history.

(56) References Cited

U.S. PATENT DOCUMENTS 3,341,996 A * 9/1967 Jones ................ E04F 15/02144
52/309.13
4,635,410 A   1/1987 Chumbley
(Continued)

FOREIGN PATENT DOCUMENTS

CN       2643062 Y       9/2004
CN    101538437 A *      9/2009
(Continued)

OTHER PUBLICATIONS

Azo Materials, Chlorinated Polyethylene—CPE Spec Sheet, 2001, 2 pages, <https://www.azom.com/article.aspx?ArticleID=346> (Year: 2001).*
(Continued)

*Primary Examiner* — Jacob J Cigna
(74) *Attorney, Agent, or Firm* — David B. Tingey; Bryant J. Keller; Kirton McConkie (57) ABSTRACT

The manufactured product for covering surfaces comprises a first decorative layer having a visible face and a laying face opposite to the visible face, the laying face being adapted to be turned towards a laying surface to be covered, and a second layer arranged on the laying face of the first layer and made of a magnetic material or a metal material.

14 Claims, 5 Drawing Sheets

(51) Int. Cl.
  *B32B 21/08* (2006.01)
  *B32B 27/08* (2006.01)
  *B32B 29/00* (2006.01)
  *B32B 3/14* (2006.01)
  *B32B 9/00* (2006.01)
  *B32B 15/04* (2006.01)
  *B32B 27/06* (2006.01)
  *B32B 15/00* (2006.01)
  *B32B 21/04* (2006.01)
  *B32B 21/00* (2006.01)
  *B32B 9/04* (2006.01)
  *B32B 7/04* (2019.01)

(52) U.S. Cl.
  CPC .................. *B32B 9/00* (2013.01); *B32B 9/04* (2013.01); *B32B 15/00* (2013.01); *B32B 15/04* (2013.01); *B32B 21/00* (2013.01); *B32B 21/04* (2013.01); *B32B 21/08* (2013.01); *B32B 27/06* (2013.01); *B32B 27/08* (2013.01); *B32B 29/00* (2013.01); *B32B 2250/00* (2013.01); *B32B 2250/40* (2013.01); *B32B 2255/00* (2013.01); *B32B 2264/00* (2013.01); *B32B 2264/105* (2013.01); *B32B 2307/20* (2013.01); *B32B 2307/208* (2013.01); *B32B 2451/00* (2013.01); *B32B 2471/00* (2013.01); *B32B 2607/02* (2013.01)

(56) References Cited

U.S. PATENT DOCUMENTS

| | | | | |
|---|---|---|---|---|
| 5,476,559 A * | 12/1995 | Chiro | ................ | E04F 13/0883 156/310 |
| 5,927,033 A * | 7/1999 | Kreckl | ................ | E04F 13/0883 52/390 |
| 6,476,113 B1 * | 11/2002 | Hiles | ................... | B29C 45/0013 524/439 |
| 10,189,236 B2 * | 1/2019 | Lautzenhiser | .......... | E04F 13/30 |
| 2006/0147892 A1 * | 7/2006 | Moore | ...................... | G09F 7/04 434/430 |
| 2008/0202053 A1 * | 8/2008 | Guy | ...................... | E04F 13/0883 52/391 |
| 2009/0263634 A1 * | 10/2009 | Hyer | ..................... | E04F 13/002 428/195.1 |
| 2010/0236159 A1 * | 9/2010 | Hyer | ..................... | E04F 13/002 52/105 |
| 2011/0165386 A1 * | 7/2011 | Deetz | ........................ | G09F 7/04 428/195.1 |
| 2012/0000156 A1 * | 1/2012 | Esposito | .......... | E04F 15/02144 52/309.13 |
| 2016/0319553 A1 * | 11/2016 | Lautzenhiser | .......... | B32B 27/22 |

FOREIGN PATENT DOCUMENTS

| | | | | |
|---|---|---|---|---|
| CN | 203200602 U | | 9/2013 | |
| DE | 3804995 A1 | | 8/1989 | |
| GB | 2102406 A | * | 2/1983 | ............. C04B 28/02 |
| JP | H03 98081 A | | 4/1991 | |

OTHER PUBLICATIONS

American Elements, Strontium Ferrite Spec Sheet, 2020, 8 Pages, <https://www.americanelements.com/strontium-ferrite-12023-91-5> (Year: 2020).*

Amesweb, Iron and Iron Alloys Spec Sheet, 2020, 1 Page, <https://amesweb.info/Materials/Density_of_Iron.aspx> (Year: 2020).*

International Search Report and Written Opinion dated Dec. 19, 2016 from International Patent Application No. PCT/IB2016/055529 filed Sep. 16, 2016.

* cited by examiner

MANUFACTURED PRODUCT FOR COVERING SURFACES AND RELATED PROCESSES OF REALIZATION AND LAYING

CROSS REFERENCE TO RELATED APPLICATION(S)

This application is a U.S. National Stage Entry of International Patent Application No. PCT/IB2016/055529, filed Sep. 16, 2016, which claims the benefit of Italian Patent Application No. UB2015A003663, filed Sep. 16, 2015, the disclosures of which are hereby incorporated entirely herein by reference.

TECHNICAL FIELD

The present invention relates to a manufactured product for covering surfaces and to the relative realization and laying processes.

BACKGROUND ART

Until now numerous manufactured products exist usable both for the realization of flooring as well as for the covering of building walls.

In particular, the most widespread and commonly employed manufactured products are of the type of ceramic tiles for the covering of walls and/or floors, wooden or laminated strips for flooring, decorative sheet covering, e.g., wallpaper for walls, decorative or insulating panel elements, slabs and laminated sheets.

The decorative or insulating panels are generally made of polymethylmethacrylate (PMMA), leather, polystyrene, polyurethane, metal, wood, plywood and fiberglass; the slabs are mainly made of plastic, stone, acrylic, steel, aluminium, melamine resin, copper and bronze and the laminated sheets are made of wood, plastic, aluminium, steel, copper, bronze and polymethylmethacrylate (PMMA).

In more detail, the manufactured products of known type generally comprise a substantially unfinished laying face, which is placed turned towards a laying surface to be covered, and a decorated visible face.

The laying of these manufactured products differs depending on the respective arrangement on the horizontal or vertical laying surfaces to be covered.

Unlike vertical surfaces, which generally remain almost totally visible and on which no particular weights or loads are applied except decorative and adornment elements to make the environment pleasurable, horizontal surfaces are subject to having to support the weight of furniture of various kinds and the trampling of people passing above.

As regards the installation of tiles made of ceramic material, the laying surface to be covered must be cleaned of any previously deposited material, which could compromise the quality of the installation, and made as flat and square as possible.

Once the laying surface to be covered has been prepared, a layer of adhesive material is spread, on which the individual tiles are then positioned.

The layer of adhesive material is therefore interposed between the laying surface to be covered and the laying face of the tiles.

The adhesive materials most commonly used are mortar type and cement-based or organic-based adhesives.

The laying of the tiles made of ceramic material of known type has some drawbacks.

In particular, one drawback is related to the need to interpose a layer of adhesive material between the laying face of the tile and the laying surface to be covered, to which the implementation deadlines are related.

The laying operations are impractical and slow, since it is necessary to pay attention to spreading a layer of adhesive material having uniform thickness.

Furthermore, the laying times of the tiles to cover an entire surface are very long and special resting time must be complied with after the laying operations in which, generally, the tiles cannot be stepped on and subjected to stresses.

A further drawback is related to the removal operations of the tiles of an existing covering.

In fact, the removal operations are particularly invasive and can damage both the tiles and the laying surface to be covered on which they are placed, thus resulting in the need to use new tiles and perform restoring jobs of the laying surface.

In particular, in the case in which the replacement of even a few tiles is required, it can be difficult to find the same on the market, and therefore it is generally necessary to carry out the complete replacement of all covering tiles.

This inevitably entails significant costs.

These operations turn therefore into costs for additional purchases of new tiles and for labour for the restoration of the laying surfaces to be covered.

As far as the manufactured products of the type of wooden or laminated strip are concerned, three laying types are known.

In a first laying type, between the laying surface to be covered and the laying face of the wooden or laminated strips, a layer of adhesive material is interposed.

In a second laying type, on the laying surface to be covered is arranged a layer of sound absorbing material, on which are arranged the wooden or laminated strips suitably interlocked to one another.

In a third laying type, the wooden or laminated strips are nailed to a wooden joist immersed in a cement base formed on the laying surface to be covered.

Also the wooden or laminated strips and the related laying methods have some drawbacks.

In particular, regardless of the laying method employed, one drawback is related to the laying realization times and to the waiting times before being able to pass on the obtained flooring, which are particularly long in order to ensure a good result of the work carried out.

Furthermore, another drawback is related to the possibility of laying errors and the related correction procedures of such errors which are particularly complex and require long execution times.

A further drawback is related to the difficulties that arise in the case in which the wooden or laminated strips have to be removed or replaced since, in this case, particularly hard-working removal and restoration operations are required.

Finally, as regards the sheets of wallpaper, prior to the laying operations, it is necessary to free the laying surface to be covered of any type of roughness and make it as flat as possible.

Once the laying surface to be covered is prepared, a layer of adhesive material is spread, generally cellulose-based, on the laying face of the sheet of wallpaper which is then placed on the laying surface to be covered itself.

Alternatively, a type of sheets of wallpaper is known having a layer of adhesive material on the laying face.

For the application of this type, the sheet of wallpaper must be placed in contact with water and subsequently laid on the laying surface to be covered.

The sheets of wallpaper and the related laying methods have some drawbacks.

In particular, one drawback is related to the uniform spreading operations of the layer of adhesive material on the entire laying face of the sheet of wallpaper that has to be spread on the laying surface to be covered, and these operations require a lot of time and precision of execution.

Another drawback is related to the application of the sheets of wallpaper that, generally having an elongated form, require special attention in the application and, in the event of application errors, the job of removing and reapplying a new sheet of wallpaper is particularly difficult.

As far as the decorative and insulating panels are concerned, the slabs and laminated sheets are generally affixed on the laying surfaces to be covered by means of suitable adhesives or fixing means.

Such manufactured products have some drawbacks related to the spreading of the adhesives on them for their fixing on the laying surfaces to be covered.

Another drawback is related to the removal operations of such decorative or insulating panels, slabs and laminated sheets from the laying surfaces to be covered that may be damaged thus requiring their replacement and related additional purchasing costs.

DESCRIPTION OF THE INVENTION

The main aim of the present invention is to provide a manufactured product for covering surfaces that allows simplifying the laying operations of the manufactured products themselves and their times of execution.

Another object of the present invention consists in simplifying the operations of removal and/or displacement of the manufactured products themselves from the laying surface to be covered in the case of errors during the application or in case one wish to change their arrangement.

Yet another object of the present invention consists in the reduction of the settling time following the laying operations, or the reduction in the interval of time in which it is not possible to pass on the laid manufactured products or to perform actions on them that could jeopardize the quality of the installation.

Another object of the present invention is to provide a manufactured product for covering surfaces which allows to overcome the mentioned drawbacks of the prior art within the ambit of a simple, rational, easy, effective to use as well as affordable solution.

The above mentioned objects are achieved by the present manufactured product for covering surfaces having the characteristics of claim 1.

BRIEF DESCRIPTION OF THE DRAWINGS

Other characteristics and advantages of the present invention will become better evident from the description of a preferred, but not exclusive, embodiment of a manufactured product for covering surfaces, illustrated by way of an indicative, but non-limiting, example in the accompanying drawings, wherein.

EMBODIMENTS OF THE INVENTION

With particular reference to such figures, reference number 1 globally indicates a manufactured product for covering surfaces.

The manufactured product 1 comprises a first decorative layer 2 having a visible face 3 and a laying face 4 which is opposite to the visible face 3 and which, during use, is adapted to be turned towards a laying surface to be covered 5.

In the particular embodiment shown in the figures, the laying surface to be covered 5 can be a horizontal treadable surface or a vertical masonry wall, a plasterboard wall, a raised floor, a modular wall or the like.

In more detail, the raised floor is composed of a modular structure in which each module comprises a base frame to rest on the ground, height adjustable, and a modular support element associated with such base frame, made e.g. of materials such as chipboard/wood, calcium sulphate, thermosetting resins, inert material or other similar materials.

According to the invention, the manufactured product 1 comprises a second layer 6 made of at least one of a magnetic material and a metal material arranged on the laying face 4 of the first layer 2 and an intermediate fixing layer 7 interposed between the first layer 2 and the second layer 6 and adapted to fix the second layer 6 to the laying face 4. In the present discussion, the first layer 2 is selected from the group comprising: a tile 2a made of ceramic material, a strip 2b made of wooden or laminated material, a sheet of wallpaper 2c for coating, a decorative or insulating panel 2d, slabs and laminated sheets.

Preferably, the second layer 6 has a thickness of between 0.3 mm and 3 mm.

In particular, in the case in which the second layer 6 is made of a magnetic material, it is composed of a sheet of a flexible magnetic material, lightweight and having a glossy magnetic surface with anti-corrosion protection.

In more detail, the second layer 6 comprises strontium ferrites with a weight concentration varying between 85% and 95% and chlorinated polyethylene with a weight concentration varying between 5% and 15% with respect to the total weight of the second layer itself.

In the case in which the second layer 6 is made of a metal material, this may be of the type of a metal mixture 8a, a metal sheet 8b and a metal paint 8c.

In particular, the mixture 8a is made of a synthetic resin dispersed with metal powders of the type of magnetite and titanium dioxide.

In more detail, the mixture 8a is composed of magnetite with a weight concentration varying between 50% and 70%, titanium dioxide with a weight concentration varying between 5% and 10% and the rest with respect to the total weight consisting of water.

To make the mixture 8a a dilution is required with up to 3% of water.

The laying surface to be covered 5 must be clean, smooth, dust-free and dry.

Once such third layer 8 is dried, the manufactured product 1 can be placed on the third layer itself for the magnetic fixing of the second layer 6 to the metal mixture 8a.

In the case in which it is the laying surface to be covered 5 to be covered with the mixture 8a, the laying surface to be covered itself can be repainted with any type of water-based paint.

The metal sheet 8b is composed of iron powders having a weight concentration varying between 85% and 95% and chlorinated polyethylene having a weight concentration varying between 5% and 15% with respect to the total weight of the metal sheet 8b.

In other words, the metal sheet 8b is substantially a metal rubber sheet.

In particular, the metal sheet 8b is particularly flexible due to the extra-thin and lightweight thicknesses that ease the relative application operations to the laying surface to be covered 5 or to the laying face 4.

In addition, the metal sheet 8b has good characteristics in terms of acoustic and thermal insulation, protection against moisture, resistance to loads and proves suitable to be arranged on under-floor heating systems.

The metal sheet 8b is cut to size to cover the entire laying surface to be covered 5, or alternatively, to cover the entire laying face 4, and is applied on it.

The metal fluid material 8c is substantially composed of a water-based dark grey metal paint containing ferrous particles which, in the preparation process, may be diluted with up to 5% of water.

Conveniently, in the case in which the fluid material 8c is diluted with less water a levelling material is obtained. Furthermore, less water allows obtaining a thicker product which would allow the application of a smaller number of layers.

Before applying the fluid material 8c, it is necessary that the laying surface to be covered 5, or the laying face 4, is clean, smooth, dry and dust-free and that it is covered with a layer of water-based fixing agent.

Firstly a layer of metal fluid material 8c is applied, then a further layer of fluid material 8c can be applied after approximately 4 hours.

If greater adhesive force is required, before applying additional layers, it is necessary to wait one night so that the layers applied dry.

Generally, two layers of fluid material 8c are enough but, depending on the requirements of use, it is possible to apply further layers.

The laying surface to be covered 5, or the laying face 4, painted with the fluid material 8c, can be repainted with any type of standard paint.

Once the laying surface to be covered 5 has been painted with the fluid material 8c, the installation of the manufactured products 1 ensues, and the related magnetic fixing between the second layer 6 and the fluid material 8c.

The mixture 8a, unlike the fluid material 8c, has greater magnetic force than the magnetic force of two layers of fluid material 8c.

The intermediate layer 7 comprises an adhesive material.

Preferably, the adhesive material is of the adhesive tape or glue type.

Such adhesive tapes are generally double sided adhesive and have good flexibility, thanks to their reduced thicknesses, and sensitivity to the pressure exerted so as to make fixing more resistant.

Glues are generally reactive polyurethane-based and have good toughness, strength and speed characteristics.

These glues are particularly suitable for the application on manufactured products made of wood and derivatives, plastic laminates, foam polystyrene, metals and plastics.

The use is also known of polyvinyl acetate resin-based glues that are inexpensive and suitable for use on wood, but they require long drying times.

The process for the realization of the manufactured product 1 is described below.

The process for the realization of the manufactured product 1 comprises:

a step of providing the first layer 2;

a step of providing the second layer 6 to size with respect to the first layer 2;

a step of interposing the intermediate layer 7 between the first decorative layer 2 and the second layer 6.

In the step of providing the first decorative layer 2, an individual first layer 2 or a plurality of first layers 2 are provided adapted to be assembled with the second layer 6 made of a magnetic or metal material.

In the step of providing the second layer 6, the second layer 6 is provided to the size of the first layer 2.

The step of providing the second layer 6, in the case of a magnetic material, can comprise a preliminary cutting step of a roll of the second layer 6, in which such roll is cut and reduced into pieces having dimensions coinciding with the dimensions of the first layer 2.

In more detail, the step of interposing comprises:

a step of laying the intermediate layer 7 on the laying face 4;

a step of fixing the second layer 6 to the laying face 4.

Alternative embodiments cannot however be ruled out in which the second layer 6 has the intermediate layer 7 arranged on a relative face which is in turn arranged at the laying face 4.

Similarly, in the case in which the second layer 6 is made of a metal material, and in the present case the metal sheet 8b, the step of providing can comprise a preliminary cutting step of a roll of the metal sheet itself in such a way as to obtain pieces having dimensions coinciding with the dimensions of the first layer 2.

Figures 1, 2, 3, 4:
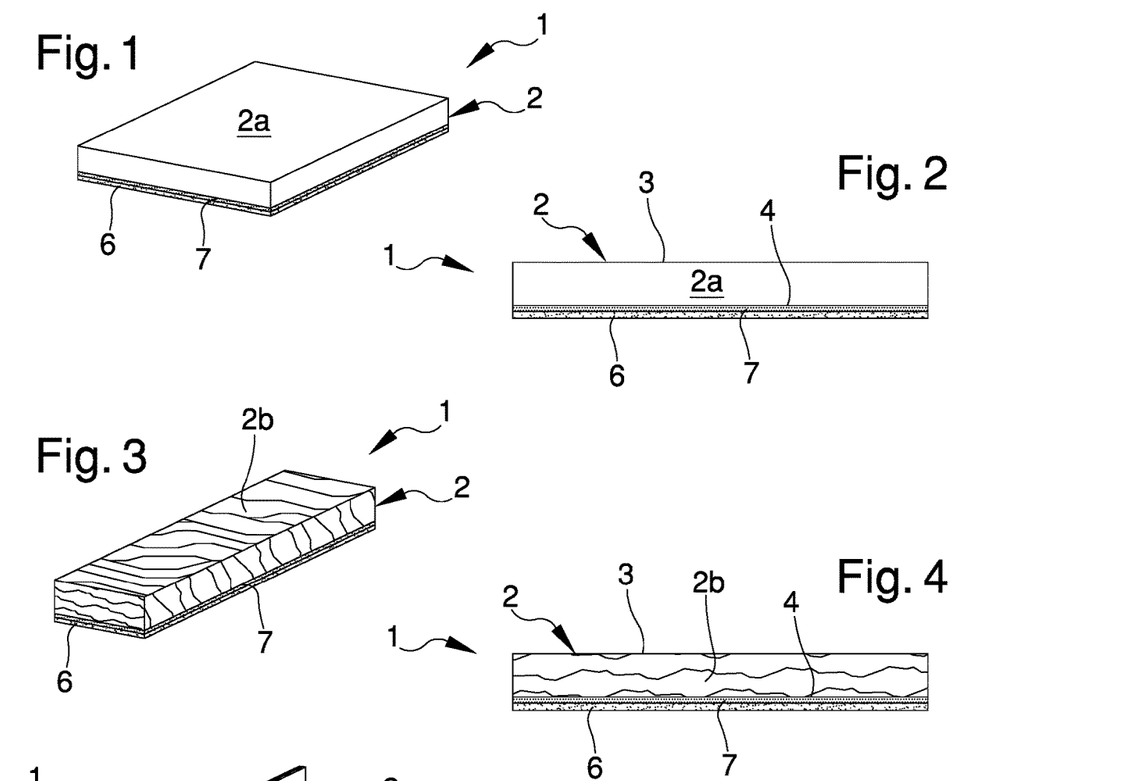
FIG. 1 is an axonometric view of a first embodiment of the manufactured product according to the invention.
FIG. 2 is a side view of the manufactured product of FIG. 1.
FIG. 3 is an axonometric view of a second embodiment of the manufactured product according to the invention.
FIG. 4 is a side view of the manufactured product of FIG. 3.

A first embodiment, shown in the FIGS. 1 and 2, relates to a tile which has a first layer 2 comprising a plate-shaped element 2a made of ceramic material or stone, having a laying face 4, which is substantially unfinished and on which is laid the intermediate fixing layer 7 and a decorated visible face 3 opposite to the laying face 4.

The tile comprises a second layer 6, made with one of a magnetic material and a metal material, and an intermediate layer 7 interposed between the laying face 4 and the second layer 6.

The second layer 6, in the case of the magnetic sheet, can be provided already to the size of the first layer 2 or it can be provided in the form of a roll which is then cut to the size of each tile 2a and fixed to the relative laying face 4 by means of the intermediate layer 7 interposed between them.

An alternative embodiment cannot however be ruled of the manufactured product 1 in which the second layer 6 comprises a laying side on which the intermediate layer 7 is arranged prior to the application step.

The second layer 6 thus formed is then fixed to the laying face 4 of each tile 2a.

In the case in which the second layer 6 is made of a metal material, and in the present case it consists of the metal mixture 8a, it is spread over the entire laying face 4.

Alternatively, in the case in which the second layer 6 consists of the metal sheet 8b, such metal sheet 8b is associated with the laying face 4 by means of the interposition of the intermediate layer 7.

Furthermore, it cannot be ruled out that the second layer 6 consists of a metal paint 8c that is spread on the laying face 4 of the tile.

This solution is however applicable in the case of tiles having small size and reduced weight.

A second embodiment of the manufactured product 1 relates to a strip, shown in FIGS. 3 and 4, comprising a first layer 2 having a strip element 2b made of a material selected from a wooden or laminated material.

Such strip element 2b comprises a laying face 4, which is substantially unfinished, and a visible face 3 opposite to the laying face 4 and suitably decorated.

The strip has the second layer 6, made with one of the magnetic material and the metal material, and the intermediate layer 7 interposed between the laying face 4 and the second layer 6.

The second layer 6, irrespective of the fact that it is the magnetic sheet or the metal sheet 8b, can already be provided to the size of the first layer 2 or it can be provided in the form of a roll which is then cut to size on each strip 2b and fixed to the relative laying face 4 through the intermediate layer 7 interposed between them.

An alternative embodiment cannot be ruled out of the strip in which the second layer 6 comprises a laying side on which the intermediate layer 7 is arranged prior to the application step.

The second layer 6 thus formed is then fixed to the laying face 4 of each strip 2b.

Figure 5:
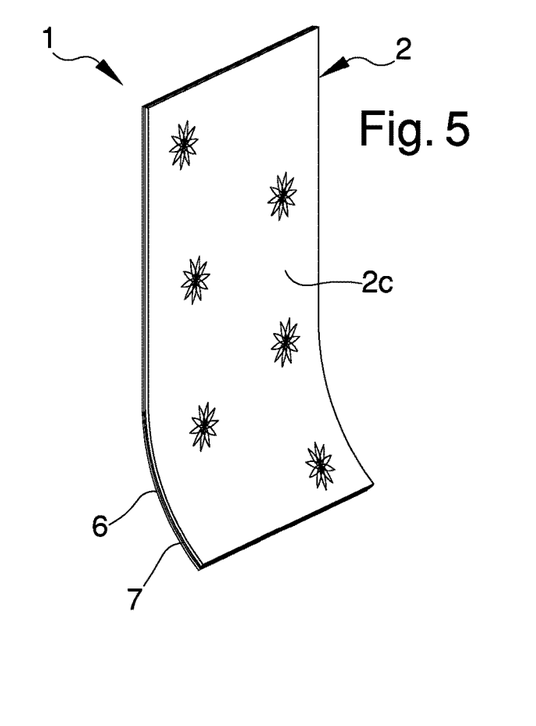
FIG. 5 is an axonometric view of a third embodiment of the manufactured product according to the invention.
Figure 6:
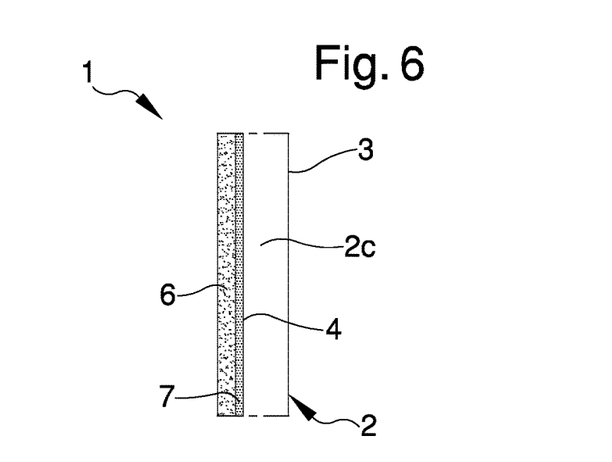
FIG. 6 is a side view of the manufactured product of FIG. 5.

A third embodiment of the manufactured product 1 relates to a decorative sheet covering for walls, shown in FIGS. 5 and 6, comprising a first layer 2 having at least one covering sheet of wallpaper 2c.

In the present case, the sheet of wallpaper 2c is made of a material selected from: natural cellulose, vinyl, non-woven fabric or Vlieseline.

Such decorative sheet 2c comprises a decorated visible face 3 and a laying face 4 that is substantially smooth, but has no decoration, on which is arranged the intermediate fixing layer 7.

The decorative sheet covering comprises a second layer 6 made of one of a magnetic material and a metal material arranged on the laying face 4 of the first layer 2, and an intermediate fixing layer 7 interposed between the first layer 2 and the second layer 6 adapted to fix the second layer 6 to the laying face 4.

The second layer 6, irrespective of the fact that it is the magnetic sheet or the metal sheet 8b, can be provided already to the size of the first layer 2 or it can be provided in the form of a roll which is then cut to the size of each sheet of wallpaper 2c and fixed to the relative laying face 4 through the intermediate fixing layer 7 interposed between them.

An alternative embodiment of the decorative sheet covering cannot however be ruled out in which the second layer 6 comprises a laying side on which the intermediate layer 7 is arranged prior to the application step.

The second layer 6 thus formed is then fixed to the laying face 4 of each sheet of wallpaper 2c.

A fourth embodiment of the manufactured product 1 relates to a panel element for surfaces to be covered comprising a first layer 2 composed of a decorative and/or insulating panel 2d.

The first layer 2 has a visible face 3 and a laying face 4 opposite to the visible face 3, the laying face 4 being adapted to be turned towards a laying surface to be covered 5.

The panel element comprises a second layer 6, made with one of a magnetic material and a metal material arranged on the laying face 4 of the first layer 2, and an intermediate fixing layer 7 interposed between the first layer 2 and the second layer 6 and adapted to fix the second layer itself to the laying face 4.

In the present case, the decorative and/or insulating panel 2d is of the type of: a panel for the application of finishes, e.g. on furnishings, a panel for the covering of walls, a panel for the covering of floors, an insulating panel, a display panel.

In particular, as regards the realization of panels 2d for the application of finishes, covering of walls, covering of floors and insulation, on the laying face 4 of the panel 2d, which is substantially smooth, is arranged the intermediate fixing layer 7.

The second layer 6 can be already provided to the size of the first layer 2 or it can be provided in the form of a roll and then cut to the size of each decorative or insulating panel 2d and fixed to the relative laying face 4 through the intermediate fixing layer 7 interposed between them.

An alternative embodiment of the manufactured product 1 cannot however be ruled out in which the second layer 6 comprises a laying side on which the intermediate layer 7 is arranged prior to the application step.

The second layer 6 thus formed is then fixed to the laying face 4 of the decorative or insulating panel 2d.

As regards, on the other hand, the display panels 2d, in a first embodiment the intermediate fixing layer 7 is arranged on the laying face 4 of the panel itself.

The second layer 6 can be already provided to the size of the first layer 2 or it can be provided in the form of a roll and then cut to the size of each display panel 2d.

The second layer 6 is then arranged on the laying face 4 through the intermediate fixing layer 7 interposed between them.

The visible face 3 of the display panel 2d is used to apply on it, e.g., a layer of metal material for the fixing on the panel itself of elements comprising a magnetic material.

In a second alternative embodiment of display panels 2d the second magnetic layer 6 is arranged both on the laying face 4 and on the visible face 3 of the panel itself by means of the interposition of the intermediate fixing layer 7.

Alternatively, the second layer 6 may comprise a laying side on which the intermediate layer 7 is arranged prior to the application step.

In a third alternative embodiment of display panels 2d, the second layer 6 is arranged both on the laying face 4 and on the visible face 3 of the panel itself by means of the interposition of the intermediate fixing layer 7 and, in more detail, the metal sheet 8b is arranged on the laying face 4.

In a fourth alternative embodiment of the display panels 2d, the second magnetic layer 6 is fixed on the laying face 4 by means of the interposition of the intermediate fixing layer 7, while on the visible face 3 a second multipole magnetic layer 6a is fixed through the interposition of the intermediate layer 7.

In more detail, the second multipole magnetic layer 6a comprises a plurality of first magnetization bands 12 and of second magnetization bands 13 alternated to one another and having a positive pole and a negative pole, respectively.

Alternative embodiments cannot however be ruled out in which the second multipole magnetic layer 6a exclusively comprises a plurality of first magnetization bands 12 or a plurality of second magnetization bands 13 spaced apart from one another.

Preferably, the second multipole magnetic layer 6a may be the type of a sheet of flexible material, lightweight and with a glossy surface with anti-corrosion protection.

The first magnetization bands 12 and the second magnetization bands 13 have a maximum width of 5 mm and extend horizontally along the entire length of the sheet itself.

An alternative embodiment of the second multipole magnetic layer 6a cannot however be ruled out in which the first and the second magnetization bands 12, 13 extend vertically along the entire length of the sheet itself.

Between each first magnetization band 12 and second magnetization band 13 is present a separation line, preferably made of a non-magnetic material, without any magnetic polarity.

Also the second multipole magnetic layer 6a, similarly to the second layer 6, may comprise strontium ferrites having a weight concentration varying between 85% and 95% and chlorinated polyethylene having a weight concentration varying between 5% and 15% with respect to the total weight of the second layer itself.

The second multipole magnetic layer 6a can be already provided to the size of the first layer 2 or it can be provided in the form of a roll and then cut to the size of each display panel 2d.

Alternatively, the second multipole magnetic layer 6a may comprise a laying side on which the intermediate layer 7 is arranged prior to the application step.

A fifth embodiment of the manufactured product 1 relates to a slab, not shown in the illustrations, with a first layer 2 for decoration and/or covering comprising a decorated visible face 3 and a laying face 4, opposite to the visible face 3.

The slab comprises a second layer 6, made with one of a magnetic material and a metal material, and an intermediate fixing layer 7 interposed between the laying face 4 and the second layer 6.

The second layer 6, made both of a magnetic material, and therefore consisting of the magnetic sheet, and of a metal material, and therefore consisting of the metal sheet 8b, can be already provided to the size of the first layer 2, or it can be provided in the form of a roll and then cut to the size of each slab and fixed to the relative laying face 4 through the intermediate fixing layer 7 interposed between them.

An alternative embodiment of the manufactured product 1 cannot however be ruled out in which the second layer 6 comprises a laying side on which the intermediate layer 7 is arranged prior to the application step.

The second layer 6 thus obtained is then fixed to the laying face 4 of the slab.

It cannot however be ruled out that the second layer 6 is made of a metal material and is the type of the metal mixture 8a or metal paint 8c that in the same way are spread on the laying face 4 of the slab.

A sixth embodiment of the manufactured product 1, not shown in detail in the figures, relates to laminated sheets comprising a first layer 2 composed of a covering surface with a visible face 3, for decoration and/or covering and/or flooring of horizontal or vertical laying surfaces, and a laying face 4.

The laminated sheets comprise a second layer 6, made with one of a magnetic material and a metal material, and an intermediate fixing layer 7 between the second layer 6 and the laying face 4 of the laminated sheets.

The second layer 6 can be already provided to the size of the first layer 2 or it can be provided in the form of a roll and then cut to the size of each laminated sheet and fixed to the relative laying face 4 by means of the intermediate fixing layer 7 interposed between them.

An alternative embodiment of the manufactured product 1 cannot however be ruled out in which the second layer 6 comprises a laying side on which the intermediate layer 7 is arranged prior to the application step.

The second layer 6 thus formed is then fixed to the laying face 4 of the laminated sheets.

A seventh embodiment of the manufactured product 1, not shown in detail in the illustrations, relates to a mosaic element comprising a first layer 2 having a plurality of tesserae, made of a material selected from ceramics, glass, plastic or the like, associated with a grid element by means of suitable adhesive means.

The first layer 2 comprises a visible face 3, coinciding with the decorated surface defined by the tesserae, and a laying face 4 opposite to the visible face 3 and substantially coinciding with the grid element of the first layer 2.

Advantageously, the mosaic element comprises a second layer 6, made of one of the magnetic material and the metal material arranged on the laying face 4 of the first layer 2; and an intermediate fixing layer 7 interposed between the first layer 2 and the second layer 6 and adapted to fix the second layer 6 to the laying face 4.

The second layer 6, made of a magnetic material, and therefore consisting of the magnetic or metal sheet, and therefore consisting of the metal sheet 8b, can be already provided to the size of the first layer 2 or it can be provided in the form of a roll and then cut to size of each mosaic element and fixed to the relative laying face 4 through the intermediate fixing layer 7 interposed between them.

An alternative embodiment of the mosaic element cannot however be ruled out in which the second layer 6 comprises a laying side on which the intermediate layer 7 is arranged prior to the application step.

The second layer 6 thus formed is then fixed to the laying face 4 of the mosaic.

An eighth embodiment, not shown in the illustrations, relates to a textile manufactured product comprising a first layer 2 made at least in part of textile fibres and having a visible face 3 and a laying face 4, opposite to the visible face 3, the laying face 4 being adapted to be turned towards a laying surface to be covered 5.

Advantageously, the textile manufactured product comprises a second layer 6, made of one of a magnetic material and a metal material arranged on the laying face 4 of the first layer 2, and an intermediate fixing layer 7 interposed between the first layer 2 and the second layer 6 and adapted to fix the second layer 6 to the laying face 4.

In the present case, the textile fibres of the first layer 2 substantially define a mat commonly known as fitted carpet which, once positioned on the laying surface to be covered 5 gives a high degree of comfort to the laying surface to be covered when trod upon.

The second layer 6, made of a metal or magnetic material, can be already provided to the size of the first layer 2 or can be provided in the form of a roll, cut to the size of each textile manufactured product and fixed to the relative laying face 4 through the intermediate fixing layer 7 interposed between them.

An alternative embodiment of the textile manufactured product cannot however be ruled out in which the second layer 6 comprises a laying side on which the intermediate layer 7 is arranged prior to the application step.

The second layer 6 thus formed is then fixed to the laying face 4 of the textile manufactured product.

In the remainder of this discussion, for greater descriptive fluidity, the term manufactured product refers to each of the individual manufactured products previously introduced, or rather: the tile, the strip, the mosaic, the panel, the textile product, the laminated sheets and the slab.

A ninth embodiment, not shown in the illustrations, relates to a polymeric manufactured product comprising a first layer 2 formed at least in part of the polymeric material and having a visible face 3 and a laying face 4, opposite to the visible face 3, the laying face 4 being adapted to be turned towards a laying surface to be covered 5.

Preferably, the polymeric material is selected from the group comprising: vinyl, polyvinylchloride, epoxy resin or polyurethane resin, resilient materials in general.

Advantageously, the polymeric manufactured product comprises a second layer 6, made of one of a magnetic material and a metal material arranged on the laying face 4 of the first layer 2.

An intermediate fixing layer 7 is interposed between the first layer 2 and the second layer 6 and is adapted to fix the second layer 6 to the laying face 4.

In the remainder of the discussion, for greater descriptive fluidity, the term manufactured product refers to each of the individual manufactured products previously introduced, or rather: the tile, the strip, the mosaic, the panel, the textile product, the laminated sheets, the slab and the polymeric manufactured product.

Each of the manufactured products 1, having the first layer 2 of a different material depending on the embodiment, has a sandwich-like structure, shown in FIGS. 2, 4, 6 respectively, in which the laying face 4 of the first layer 2 is arranged above the intermediate layer 7 and the second layer 6 is arranged below the intermediate layer 7.

The process for the laying of the manufactured product 1 is described below.

The laying process of the manufactured product 1 comprises:

a step of application of a third layer 8 arranged on the laying surface to be covered 5 and made of a metal material or of a magnetic material;

a step of deposition of the manufactured product 1 on the third layer 8 for the magnetic fixing of the second layer 6 on the third layer 8.

Conveniently, when the second layer 6 is made of a magnetic material then the third layer 8 is made of a metal material.

Alternatively, when the second layer 6 is made of a metal material, then the third layer 6 is made of a magnetic material.

In more detail, the third layer 8, when it is made of a metal material, is selected from the group comprising: a mixture 8a comprising a metal material, a metal sheet 8b, a fluid material 8c comprising metal particles.

Alternatively, the third layer 8, when it is made of a magnetic material, is of the type of the previously described magnetic sheet and used for the realization of the second magnetic layer 6.

In particular, in the case in which the second layer 6 is metal, the third layer 8 is of the magnetic type and, in the present case, is composed of the magnetic sheet.

In the case in which, on the other hand, the second layer 6 is magnetic, then the third layer 8 is selected from the metal mixture 8a, the metal sheet 8b, and the metal paint 8c.

A further embodiment cannot however be ruled out in which the third layer 8 comprises a mat made of a thermally and acoustically insulating material with which is associated one of the metal sheet 8b and the magnetic sheet, depending on the laying method, by means of gluing with a suitable adhesive.

In the present case, the mat is laid and fixed onto the laying surface to be covered 5 and depending on whether it has one of the metal sheet 8b and the magnetic sheet, the laying face 4 has the other of the metal sheet 8b and the magnetic sheet with respect to the mat, in such a way as to allow the magnetic coupling between the laying face 4 and the laying surface to be covered 5.

The magnetic fixing between the second layer 6 and the laying surface to be covered 5, coated through the third layer 8, keeps the manufactured product 1 motionless and in a fixed position on the laying surface to be covered itself.

Figure 7:
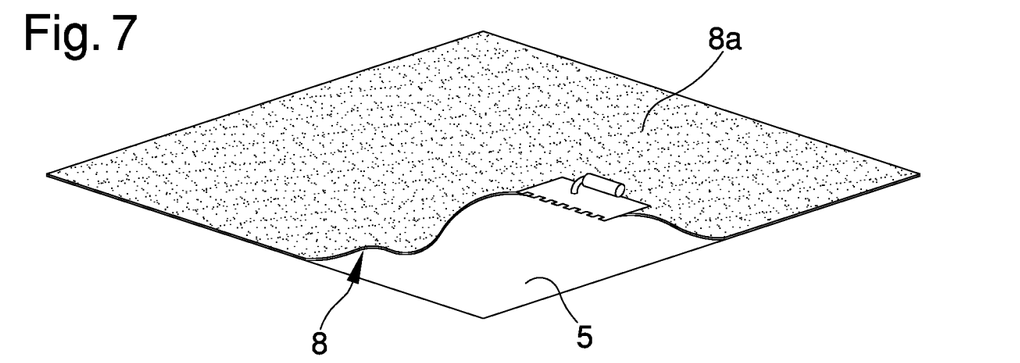
FIG. 7 is an axonometric view of the step of application of the third layer in a first laying embodiment of the manufactured product of FIG. 1.
Figure 8:
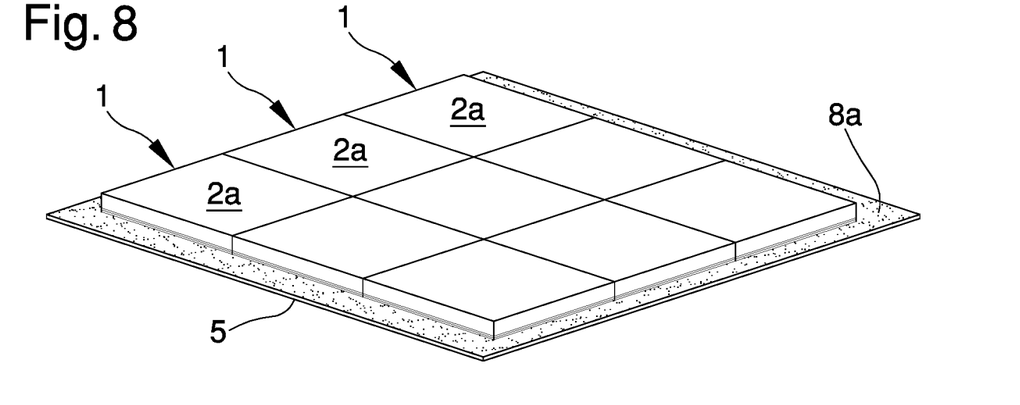
FIG. 8 is an axonometric view of the first laying embodiment of the manufactured product of FIG. 1.

In a first laying embodiment of the manufactured product 1 shown in the FIGS. 7 and 8, the application step comprises the spreading of the mixture 8a onto one of the laying surface to be covered 5 and the laying face 4, depending on the type of the manufactured product 1 and the desired laying method.

In the first laying embodiment, reference is made to the case in which the manufactured product 1 is represented by the tile.

Following the application of the third layer 8, and the relative drying, on the laying surface to be covered 5 it is possible to lay the manufactured product 1 on the third layer for the magnetic fixing of the second layer 6 to the metal mixture 8a.

The laying surface to be covered 5, coated with the mixture 8a, can be repainted with any type of water-based paint.

Alternatively, the mixture 8a is spread on the laying face 4 of the tile, while on the laying surface to be covered 5 the magnetic sheet is laid and fixed by means of suitable adhesive means.

It cannot however be ruled out that the metal sheet 8b is laid and fixed on the laying face 4 of the tile and the magnetic sheet is laid on the laying surface to be covered 5.

By way of example, in the case in which the laying surface to be covered 5 is constituted by the raised floor, the relative treadable surface is covered with several metal sheets 8b cut to size for each module.

In the first laying embodiment, the manufactured products 1 are arranged on the laying surface to be covered 5 and coupled magnetically by means of the magnetic attraction between the third layer 8 and the second layer 6.

Alternatively, on the laying surface to be covered 5 of the raised floor is laid the magnetic sheet, or the mat with which the magnetic sheet is associated through the use of a suitable adhesive, and consequently the second layer 6 of the tile is made from one of the metal mixture 8*a* and metal sheet 8*b* so as to allow the magnetic coupling between the tile and the magnetic sheet laid on the laying surface to be covered 5.

Figure 9:
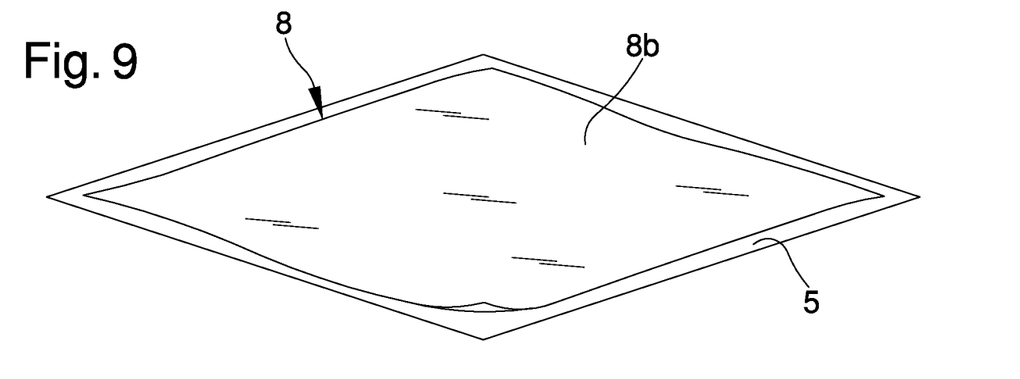
FIG. 9 is an axonometric view of the step of application of the third layer in a second laying embodiment of the manufactured product of FIG. 3.
Figure 10:
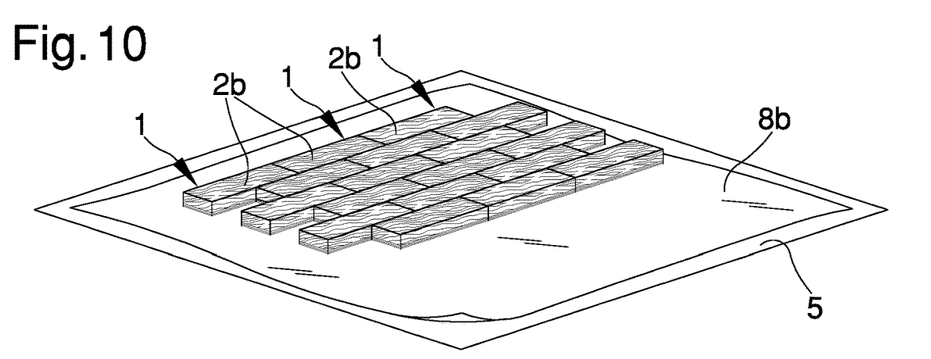
FIG. 10 is an axonometric view of the second laying embodiment of the manufactured product of FIG. 3.

In a second laying embodiment shown in FIGS. 9 and 10, the application step comprises the laying and fixing with adhesive tape of the metal sheet 8*b* on the laying surface to be covered 5.

In the second laying embodiment, reference is made to the case in which the manufactured product 1 coincides with the strip or the laminated sheets.

Once the metal sheet 8*b* is laid and fixed onto the laying surface to be covered 5, the strips 2*b*, or textile manufactured products, or laminated sheets are laid and magnetically fixed between the second magnetic layer 6 with the metal sheet 8*b*.

Alternatively, the metal sheet 8*b* is laid on the laying face 4 while on the laying surface to be covered 5 is laid, and fixed by means of suitable adhesive means, the magnetic sheet for the magnetic coupling between the strip or the laminated sheets and the laying surface to be covered 5.

Figure 11:
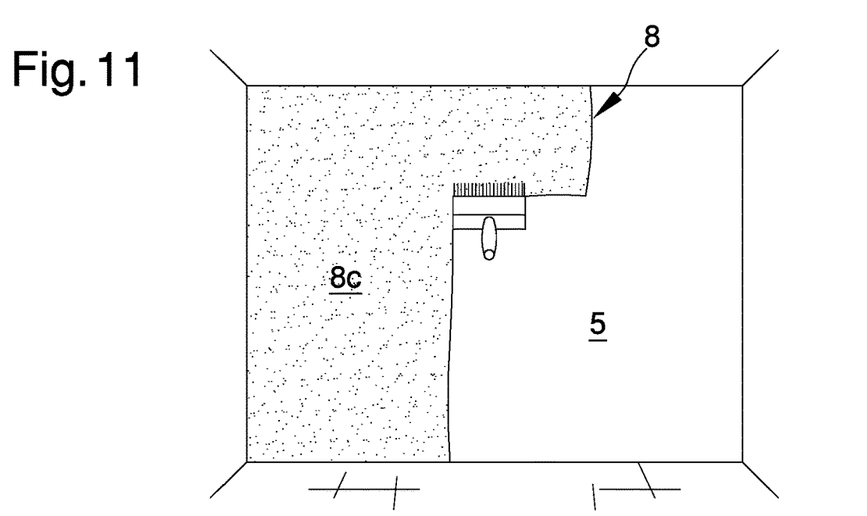
FIG. 11 is an axonometric view of the step of application of the third layer in a third laying embodiment of the manufactured product of FIG. 5.
Figure 12:
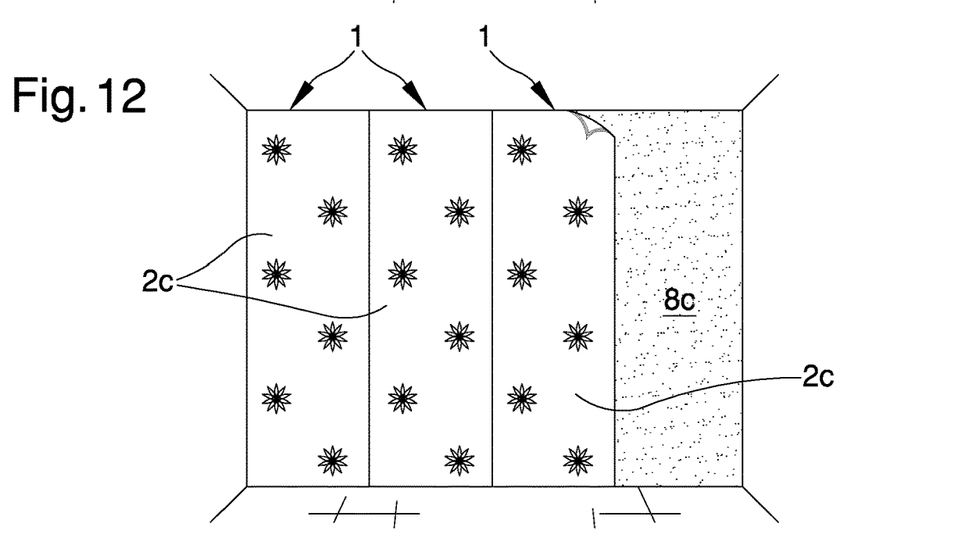
FIG. 12 is an axonometric view of the third laying embodiment of the manufactured product of FIG. 5.

In a third laying embodiment of the manufactured product 1 shown in FIGS. 11 and 12, the application step comprises the dyeing of the laying surface to be covered 5 with the fluid material 8*c*.

In the third laying embodiment, the manufactured product 1 coincides with the decorative sheet covering.

A layer of fluid metal material 8*c* is applied first, then a further layer of fluid material 8*c* can be applied after approximately 4 hours.

Before applying the fluid material 8*c*, it is necessary that the laying surface to be covered 5 is made clean, smooth, dry and dust-free and that it is covered with a layer of water-based fixing agent.

If greater force of attraction is required, before applying additional layers it is necessary to wait overnight so that the applied layers dry.

Generally, two layers of fluid material 8*c* are enough but, depending on the requirements of use, it is possible to apply additional layers.

The laying surface to be covered 5, painted with the fluid material 8*c*, can be repainted with any common type of paint.

Once the laying surface to be covered 5 has been painted with the fluid material 8*c*, the sheets of wallpaper 2*c* are laid and the second layer 6 is magnetically fixed to the fluid material 8*c*.

The mixture 8*a*, unlike the fluid material 8*c*, has greater magnetic force than the magnetic force of two layers of fluid material 8*c*.

In a fourth laying embodiment of the manufactured product 1, the application step and the laying step differ according to the type of decorative or insulating panel 2*d*.

In particular, in a laying embodiment of the panels 2*d* for the application of finishes for furnishing (not shown in the illustrations), the metal sheet 8*b* is applied to the laying surface to be covered 5, e.g. to a furnishing of which one wishes to change its appearance in a simple, quick and clean manner.

Once the metal sheet 8*b* has been laid on the laying surface to be covered 5, then it is possible to lay the panels 2*d*.

In more detail, the laying face 4 of the panel 2*d*, on which the intermediate fixing layer 7 and the second magnetic layer 6 are arranged, is positioned at the laying surface to be covered 5.

This way the magnetic fixing is obtained between the panel 2*d* and the laying surface to be covered 5.

Alternatively, the metal sheet 8*b* is applied on the laying face 4 while the magnetic sheet is laid, e.g., on a furnishing of which the appearance is to be changed in a simple, quick and clean manner; then, the panels are laid on the laying surface to be covered 5.

Similarly to the decorative or insulating panels 2*d* used as finishes for furnishing, the same laying process (not shown in the illustrations) also applies for the floor covering panels 2*d*.

In particular, the application step comprises the laying and fixing, with adhesive tape, of the metal sheet 8*b* on the laying surface to be covered 5.

The metal sheet 8*b* is first laid to cover the entire laying surface to be covered 5, and then cut to size on it.

Once the metal sheet 8*b* is laid and fixed to the laying surface to be covered 5, the panels 2*d* for covering floors are laid.

In more detail, each panel 2*d* has the second magnetic layer 6 associated with the laying face 4 of the panel itself through the interposition between the second layer 6 and the laying face 4 of the intermediate layer 7, thanks to which the panel 2*d* is magnetically fixed to the metal sheet 8*b*. It cannot however be ruled out.

Alternatively, in the case in which the magnetic sheet is laid on the laying surface to be covered 5, each panel 2*d* has the metal sheet 8*b* associated with the laying face 4 of the panel itself through the interposition between the metal sheet itself and the laying face 4 of the intermediate layer 7.

The magnetic fixing thus takes place between the panel 2*d*, on the laying face 4 of which the metal sheet 8*b* is laid, and the laying surface to be covered 5 on which the magnetic sheet is arranged.

An alternative laying embodiment of floor covering panels 2*d* cannot however be ruled out in which the metal paint 8*c* is laid on the laying surface to be covered 5, which has first to be made clean, smooth, dust-free and dry.

The floor covering panels 2*d* are laid on the laying surface to be covered 5 and through the second magnetic layer 6, arranged on the relative laying faces 4, the magnetic fixing takes place with the metal mixture 8*a* spread on the laying surface to be covered itself, which has first to be made clean, smooth, dust-free and dry.

Furthermore, the floor covering panels 2*d* can be moved and/or changed without causing any damage to the laying surface to be covered 5.

The laying surface to be covered 5, coated with the paint 8*c*, can be repainted with any type of water-based paint.

Alternatively again, the metal mixture 8*a* can be spread on the laying face 4 of the wall covering panel 2*d* and the magnetic sheet is arranged on the laying surface to be covered 5, which has first to be made clean, smooth, dust-free and dry.

As far as the wall covering panels 2*d* are concerned, the metal mixture 8*a* is spread on the laying surface to be covered 5 on which the panel itself is magnetically fixed by means of the second magnetic layer 6 arranged on the relative laying face 4.

The laying surface to be covered 5, prior to the spreading of the mixture 8*a* on it, has to be made clean, smooth, dust-free and dry.

The wall covering panels 2d can be moved and/or changed without causing any damage to the laying surface to be covered 5.

The laying surface to be covered 5, coated with the mixture 8a, can be repainted with any type of water-based paint.

Similarly to the wall covering panels 2d, also for the laying of insulating panels 2d, the metal mixture 8a or the metal paint 8c is spread on the laying surface to be covered 5, which has to be first made clean, smooth, dust-free and dry.

The magnetic fixing of the insulating panel 2d on the laying surface to be covered 5 is made through the coupling of the second magnetic layer 6 arranged on the relative laying face 4 to the laying surface to be covered.

The insulating panels 2d can be moved and/or changed without causing any damage to the laying surface to be covered 5.

The laying surface to be covered 5, coated with the mixture 8a, can be repainted with any type of water-based paint.

Alternatively, for the laying of the insulating panels 2d, the magnetic sheet is arranged on the laying surface to be covered 5 and the metal paint 8c is spread on the laying face 4 of the insulating panel 2d, in such a way as to obtain the magnetic coupling between the insulating panel 2d and the laying surface to be covered 5.

Figure 13:
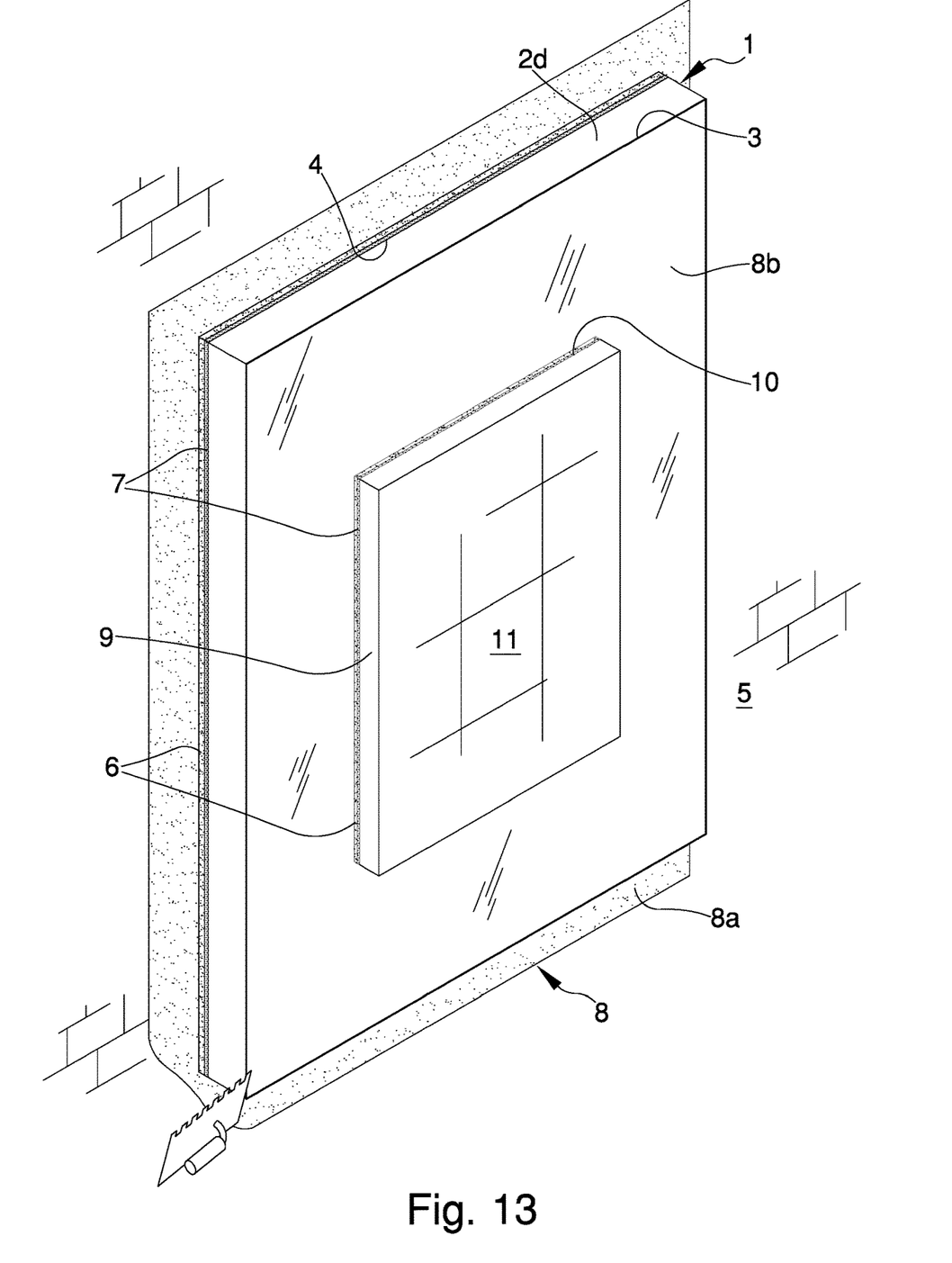
FIG. 13 is an axonometric view of the fourth laying embodiment of the manufactured product according to the invention.

As far as the display panels 2d are concerned, in a fourth laying embodiment shown by way of example in FIG. 13, the second magnetic layer 6 is arranged on the laying face 4 through the interposition of the intermediate fixing layer 7 between the laying face 4 and the second layer itself.

Similarly to what has been previously described for the insulating panels 2d, embodiments cannot be ruled out in which the display panels 2d have the magnetic sheet arranged on the laying surface to be covered 5 and the metal paint 8c spread on the laying face 4 of the insulating panel 2d, so as to obtain the magnetic coupling between the insulating panel 2d and the laying surface to be covered 5.

The display panel 2d thus formed is applied at the laying surface to be covered 5, which has to be first made clean, smooth, dust-free and dry, on which the metal mixture 8a has been spread.

On the visible face 3 the metal sheet 8b is applied, suitably cut to the size of the visible face 3, by means of the fixing with adhesive tape.

The display elements 9 are then positioned on the display panel 2d.

In particular, each display element 9 comprises a lower surface 10 and a decorated upper surface 11.

In more detail, on the lower surface 10 is arranged the second magnetic layer 6, by means of the interposition of the intermediate layer 7, through which the display element 9 is magnetically fixed to the metal sheet 8b.

An embodiment alternative to the fourth embodiment cannot however be ruled out in which on the visible face 3 is applied the magnetic sheet, suitably cut to the size of the visible face 3, by means of the fixing with adhesive tape.

The display elements 9 are then positioned on the display panel 2d.

In more detail, on the lower surface 10 is arranged the metal sheet 8b, by the interposition of the intermediate layer 7, through which the display element 9 is magnetically fixed to the magnetic sheet associated with the laying surface to be covered 5.

In a further embodiment alternative to the fourth laying embodiment of the display panels 2d, not shown in the illustrations, the display panels 2d may be used for the magnetic fixing of communicative functional elements on them.

In more detail, the second magnetic layer 6 is arranged both on the laying face 4 and on the visible face 3 of the panel itself by means of the interposition of the intermediate fixing layer 7 both between the laying face 4 and the second layer 6 as well as between the visible face 3 and the second layer 6.

In the particular embodiment shown in FIG. 13, on the laying surface to be covered 5, which has to be first made clean, smooth, dust-free and dry, the metal mixture 8a is spread.

The display panel 2d is therefore arranged at the laying surface to be covered 5 through the magnetic fixing between the mixture 8a and the second layer 6 arranged at the laying face 4 of the panel itself.

On the visible face 3 of the display panel 2d is arranged the second magnetic layer 6 by means of the interposition of the intermediate fixing layer 7 between the visible face 3 and the second layer itself.

On the second layer 6 arranged on the visible face 3 are applied the communicative functional elements which are preferably made of metallised PET and which are substantially semi-gloss, white, ultra-thin and water-resistant.

Furthermore, the communicative functional elements have a lower side with a matt metal surface resistant to corrosion that is arranged at the visible face 3 of the panel 2d, and an upper side with a white semi-gloss vinyl and water-resistant printable visible surface.

Advantageously, the display panels 2d can be moved and/or changed without causing any damage to the laying surface to be covered 5.

The laying surface to be covered 5, coated with the mixture 8a or with the paint 8c, can be repainted with any type of water-based paint.

Figure 14:
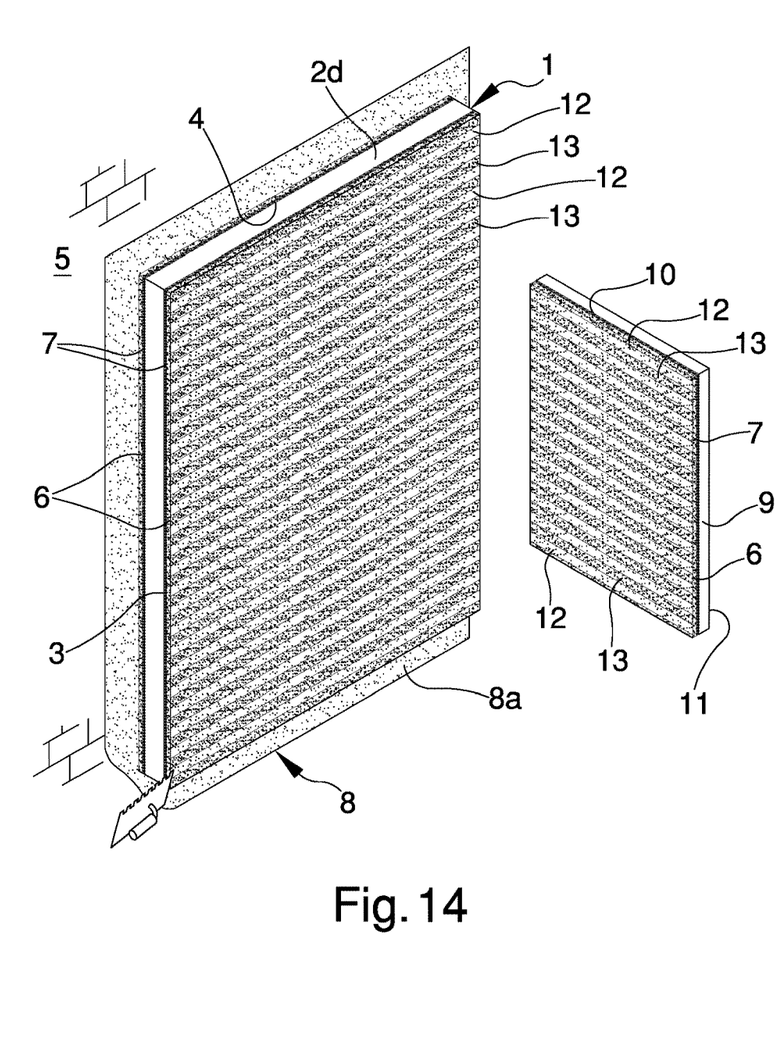
FIGS. 14 and 15 are axonometric views of an embodiment alternative to the fourth laying embodiment of the manufactured product according to the invention.
Figure 15:
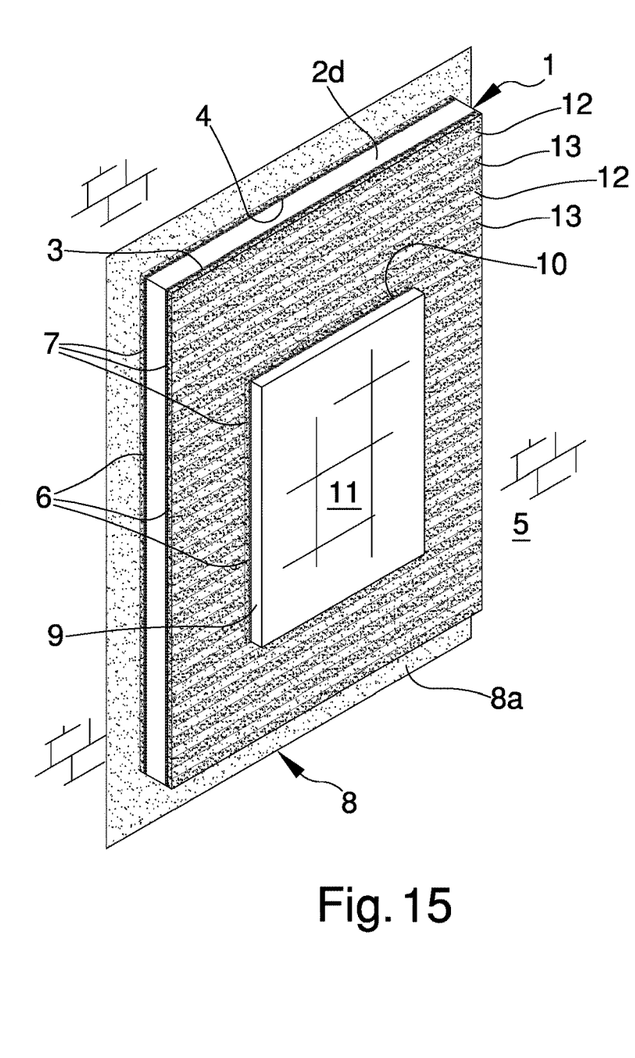

In a further embodiment alternative to the fourth laying embodiment of the display panels 2d, shown in FIGS. 14 and 15, the panels are used for the magnetic fixing of the display elements 9, e.g. large format tiles in ceramic material or furnishings such as large shelves used for the support of different kinds of objects.

In more detail, the second magnetic layer 6 is arranged on the laying face 4 of the display panel 2d by means of the interposition of the intermediate fixing layer 7 and the second multipole magnetic layer 6a is arranged on the visible face 3 of the panel itself by means of the interposition of the intermediate fixing layer 7.

On the laying surface to be covered 5, which has to be first made clean, smooth, dust-free and dry, the metal mixture 8a is spread.

The display panel 2d is then arranged at the laying surface to be covered 5 through the magnetic fixing between the mixture 8a and the second layer 6 arranged at the laying face 4 of the panel itself.

On the visible face 3 of the display panel 2d is arranged the second multipole magnetic layer 6a through the interposition of the intermediate fixing layer 7 between the visible face 3 and the second multipole magnetic layer itself.

Preferably, the second multipole magnetic layer 6a is arranged on the visible face 3 in such a way that the first magnetization bands 12 and the second magnetization bands 13 are oriented in a substantially horizontal direction.

An arrangement of the second multipole magnetic layer 6a on the visible face 3 cannot however be ruled out so that the first and second magnetization bands 12, 13 are oriented in a substantially vertical direction.

With reference to the corresponding display element 9, on the lower surface 10 is arranged the second multipole magnetic layer 6a, through the interposition of the intermediate layer 7, by means of which the display element is magnetically fixed to the second multipole magnetic layer 6a arranged on the display panel 2d.

Similarly to the first and second magnetization bands 12, 13 of the second multipole magnetic layer 6a arranged at the panel 2d, the first and second magnetization bands 12, 13 of the second multipole magnetic layer 6a arranged at the display element 9 must also have the same horizontal direction.

Conveniently, during use, the display element 9 is arranged at the visible face 3 of the display panel 2d substantially rotated by a 45° angle with respect to the vertical direction of the panel itself.

The magnetic fixing between the display element 9 and the display panel 2d occurs by rotating by an angle equal to 45°, either clockwise or anti-clockwise, the display element 9 so that the first magnetization bands 12 of the second multipole magnetic layer 6a arranged on the display element 9 are placed at and aligned with the second magnetization bands 13 of the second multipole magnetic layer 6a arranged on the display panel 2d and, similarly, that the second magnetization bands 13 of the second multipole magnetic layer 6a arranged on the display element 9 are placed at and aligned with the first magnetization bands 12 of the second multipole magnetic layer 6a arranged on the display panel 2d.

In other words, the first and second magnetization bands 12, 13 of the second multipole magnetic layer 6a arranged at the display element 9, once the display element has terminated its rotation by 45° in a clockwise or anti-clockwise direction, must have the same direction as the first and second magnetization bands 12, 13 of the second multipole magnetic layer 6a arranged at the display element 9.

This way the attraction force between the display element 9 and the display panel 2d increases and the magnetic fixing between them is therefore more stable and reliable.

To remove the display element 9 from the display panel 2d, the display element itself must be rotated by 45° in a clockwise or anti-clockwise direction with respect to the display panel 2d.

Advantageously, the display elements 9 and the display panels 2d can be moved and/or changed without causing any damage to the laying surface to be covered 5.

The laying surface to be covered 5, coated with the mixture 8a, can be repainted with any type of water-based paint.

In a fifth and a sixth laying embodiment, the application step comprises the laying and fixing with adhesive tape or nails of the metal sheet 8b on the laying surface to be covered 5.

In an alternative embodiment, the application step comprises the laying and fixing with adhesive tape or nails of the magnetic sheet on the laying surface to be covered 5.

The fifth laying embodiment, not shown in the illustrations, relates to the slab.

In more detail, the slab has the first layer 2 comprising plastic, stone, acrylic, steel, aluminium, melamine resin, copper, bronze or plasterboard.

The metal sheet 8b, or alternatively the magnetic sheet, is first cut laid to cover the entire laying surface to be covered 5 and then it is cut to size on it.

Once the metal sheet 8b has been laid and fixed to the laying surface to be covered 5, the slabs are laid and magnetically fixed to the metal sheet 8b.

In the case in which on the laying surface to be covered 5, the magnetic sheet is laid and fixed, the metal sheet 8b is associated with the laying face 4 of the slab by means of the intermediate layer 7 and for the magnetic coupling between the slab and the laying surface to be covered 5.

The sixth laying embodiment, not shown in the illustrations, relates to the laminated sheet in which the first layer 2 is made of a material selected from wood, plastic, aluminium, steel, copper, bronze, PMMA.

The metal sheet 8b is first cut to size to coat the entire laying surface to be covered 5 of the laminated sheets, which can be either horizontal or vertical, and then it is laid on it.

Once the metal sheet 8b has been laid and fixed onto the laying surface to be covered 5, the laminated sheets are laid and magnetically fixed to the metal sheet 8b.

Alternatively, the magnetic sheet is laid on the laying surface to be covered 5 and the metal sheet 8b is associated on the laying face 4 of the laminated sheet by means of the intermediate layer 7.

The magnetic coupling is thus obtained between the laminated sheets and the laying surface to be covered 5.

For the removal or, simply, the displacement of the manufactured product 1 from the position in which it had been placed on the laying surface to be covered 5, it is sufficient to apply an adequate tensile force on the manufactured product itself.

In a seventh laying embodiment, not shown in the illustrations, reference is made to the case in which the manufactured product 1 is represented by the mosaic element or by the textile manufactured product.

In particular, in the case in which the second layer 6, arranged on the laying face 4 of the mosaic element or of the textile manufactured product, is composed of the magnetic sheet, then the third layer 8 is of the metal type.

In the present case, the third layer 8 used for the laying of the mosaic element or of the textile manufactured product can be the metal mixture 8a, spread on the laying surface to be covered 5, or the metal sheet 8b, arranged on the laying surface to be covered 5 by means of suitable adhesive means.

The laying surface to be covered 5, coated with the mixture 8a, can be repainted with any type of water-based paint.

Alternatively, in the case in which the second layer 6 is made of metal material, the metal sheet 8b is laid on the laying face 4 by means of the intermediate fixing layer 7, while the magnetic sheet associated with it is laid on the laying surface to be covered 5 by means of the adhesive means.

It has in practice been found that the described invention achieves the intended objects and in particular the fact is underlined that the manufactured product thus realized allows to simplify the application operations of tiles of ceramic material, wooden or laminated strips and sheets of wallpaper on walls or floors, decorative or insulating panels, slabs and laminated sheets, mosaics or textile manufactured products.

In particular, this manufactured product can be removed, or simply displaced, by easily making such operations rapid and devoid of drawbacks due to invasive removal operations which may damage both the manufactured products as well as the laying surfaces to be covered.

Such manufactured product also facilitates the laying steps even by inexperienced laying operators wishing to dabble in DIY.

The manufactured product thus obtained allows eliminating the risks related to laying obtained with incorrect results such as, e.g., the failed setting of the manufactured product to the laying surface to be covered.

This way a solid and immediate setting of the manufactured product to the laying surface to be covered is obtained.

The use of the magnetic material layer in the manufactured product arranged on the laying surface to be covered, allows eliminating any type of fixing means including, in particular, glue for the realization of floors, therefore giving greater elasticity to the composed floors.

The second magnetic material layer and the third metal material layer are made of sound-absorbing type materials which, by absorbing the sound waves incident on them, reduce the acoustic noise in the environments in which these manufactured products are arranged.

The invention claimed is:

1. A laying process of a piece of tile for covering surfaces, the piece of tile comprising: at least one of a ceramic material and stone, at least a first decorative layer having a visible face, and a laying face opposite to said visible face, and said laying face being adapted to be turned towards a laying surface to be covered, and at least a second layer arranged on said laying face of said first decorative layer and comprising a sheet of a flexible magnetic material wherein the laying process comprises:
applying a third layer on said laying surface to be covered, said third layer comprising a metal material selected from: (a) a flexible, metal rubber sheet having a different composition than the second layer, the flexible, metal rubber sheet comprising iron (Fe) powder at a weight concentration of between 85% and 95% of a total weight of the flexible, metal rubber sheet and chlorinated polyethylene at a weight concentration of between 5% and 15% of the total weight of the flexible metal rubber sheet; and (b) a metal mixture comprising magnetite at a weight concentration of between 50% and 70% of a total weight of the metal mixture, titanium dioxide at a weight concentration of between 5% and 10% of the total weight of the metal mixture, and water at a weight concentration of between 45% and 20% of the total weight of the metal mixture; and
depositing said piece of tile on said third layer for magnetically fixing said second layer on said third layer.

2. The laying process according to claim 1, wherein said third layer comprises said flexible, metal rubber sheet.

3. The laying process according to claim 1, wherein said third layer comprises said metal mixture.

4. The laying process according to claim 1, wherein said third layer essentially covers an entirety of said laying surface to be covered.

5. The laying process according to claim 1, wherein said second layer covers a majority of said laying face.

6. The laying process according to claim 1, comprising coating said laying surface to be covered with multiple pieces of said piece of tile, with the multiple pieces being positioned mutually adjacent to each other.

7. A laying process of a piece of tile for covering surfaces, the piece of tile comprising at least one of a ceramic material and stone, at least a first decorative layer having a visible face, and a laying face opposite to said visible face, and said laying face being adapted to be turned towards a laying surface to be covered, and at least a second layer arranged on said laying face of said first decorative layer and comprising a sheet of a flexible, magnetic material having a thickness of between 0.3 mm and 3 mm, wherein the second layer comprises strontium ferrite at a weight concentration of between 85% and 95% of a total weight of the second layer, and chlorinated polyethylene at a weight concentration of between 5% and 15% of the total weight of the second layer, and wherein the laying process comprises:
applying a third layer on said laying surface to be covered, said third layer comprising an acoustic and thermal insulator comprising a flexible, metal rubber sheet having a different composition than the second layer, the flexible, metal rubber sheet comprising iron (Fe) powder at a weight concentration of between 85% and 95% of a total weight of the flexible metal rubber sheet and chlorinated polyethylene at a weight concentration of between 5% and 15% of the total weight of the flexible metal rubber sheet; and
depositing said piece of tile on said third layer for magnetically fixing said second layer on said third layer.

8. The laying process according to claim 7, wherein said piece of tile consists essentially of a piece of ceramic tile.

9. The laying process according to claim 7, wherein said flexible, metal rubber sheet covers essentially all of said laying surface to be covered.

10. The laying process according to claim 7, wherein the sheet of flexible, magnetic material substantially covers an entirety of said second layer.

11. A laying process of a piece of tile for covering surfaces, the piece of tile comprising at least one of a ceramic material and stone, at least a first decorative layer having a visible face, and a laying face opposite to said visible face, and said laying face being adapted to be turned towards a laying surface to be covered, and at least a second layer arranged on said laying face of said first decorative layer and comprising a sheet of flexible magnetic material having a thickness of between 0.3 mm and 3 mm, wherein the second layer comprises strontium ferrite at a weight concentration of between 85% and 95% of a total weight of the second layer, and chlorinated polyethylene at a weight concentration of between 5% and 15% of the total weight of the second layer, and wherein the laying process comprises:
applying a third layer on said laying surface to be covered, said third layer comprising an acoustic and thermal insulator comprising a metal mixture comprising magnetite at a weight concentration of between 50% and 70% of a total weight of the metal mixture, titanium dioxide at a weight concentration of between 5% and 10% of the total weight of the metal mixture, and water at a weight concentration of between 45% and 20% of the total weight of the metal mixture; and
depositing said piece of tile on said third layer for magnetically fixing said second layer on said third layer.

12. The laying process of claim 11, wherein said second layer essentially covers an entirety of said laying face.

13. The laying process according to claim 12, wherein said third layer essentially covers an entirety of said laying surface to be covered.

14. The laying process according to claim 13, comprising coating said laying surface to be covered with multiple pieces of said piece of tile, with the multiple pieces of said piece of tile being positioned mutually adjacent to each other.

* * * * *